United States Patent
Hironaka

(10) Patent No.: US 9,621,616 B2
(45) Date of Patent: Apr. 11, 2017

(54) METHOD OF SMOOTH TRANSITION BETWEEN ADVERTISEMENT STREAM AND MAIN STREAM

(71) Applicant: Sony Corporation, Tokyo (JP)

(72) Inventor: Takashi Hironaka, San Diego, CA (US)

(73) Assignee: Sony Corporation, Tokyo (JP)

(*) Notice: Subject to any disclaimer, the term of this patent is extended or adjusted under 35 U.S.C. 154(b) by 407 days.

(21) Appl. No.: 14/028,405

(22) Filed: Sep. 16, 2013

(65) Prior Publication Data

US 2015/0081923 A1    Mar. 19, 2015

(51) Int. Cl.
G06F 15/16    (2006.01)
H04L 29/06    (2006.01)
G06F 17/00    (2006.01)
G06F 17/30    (2006.01)

(52) U.S. Cl.
CPC ........ *H04L 65/604* (2013.01); *H04L 65/4084* (2013.01); *H04L 65/607* (2013.01); *H04L 65/80* (2013.01); *G06F 17/00* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,754,651 A | 5/1998 | Blatter et al. | |
| 6,341,315 B1 * | 1/2002 | Arroyo | H04L 49/9005 709/200 |
| 6,385,673 B1 * | 5/2002 | DeMoney | H04N 21/2326 348/E5.008 |
| 6,675,387 B1 | 1/2004 | Boucher et al. | |
| 6,721,789 B1 * | 4/2004 | DeMoney | G06F 3/061 348/E5.008 |
| 7,634,002 B2 | 12/2009 | Mukherjee et al. | |
| 8,094,727 B2 | 1/2012 | Hong et al. | |
| 8,280,895 B2 | 10/2012 | Peckham et al. | |
| 8,363,716 B2 * | 1/2013 | Kalva | H04N 21/23412 375/240.01 |
| 8,391,357 B2 * | 3/2013 | Kim | H04N 21/234327 375/240.01 |
| 8,422,509 B2 | 4/2013 | Suh et al. | |
| 8,442,121 B2 | 5/2013 | Song et al. | |
| 8,472,792 B2 | 6/2013 | Butt et al. | |
| 8,477,676 B2 | 7/2013 | Song et al. | |
| 8,478,764 B2 | 7/2013 | Norton et al. | |
| 2002/0159519 A1 | 10/2002 | Tabatabai et al. | |
| 2006/0159182 A1 | 7/2006 | Schmidt | |

(Continued)

*Primary Examiner* — Viet Vu
*Assistant Examiner* — James Edwards
(74) *Attorney, Agent, or Firm* — Fitch, Even, Tabin & Flannery LLP

(57) ABSTRACT

A system and method for processing and displaying at least two media content streams, a first content stream and an auxiliary content stream. The system receives, stores, decodes and displays at least two consecutive media content streams. The media content streams include an initial XML which includes a memory allocation datum in relation to the auxiliary content stream. The system utilizes the memory allocation datum to download and store auxiliary media content while the first content is being decoded and displayed.

19 Claims, 4 Drawing Sheets

(56) References Cited

U.S. PATENT DOCUMENTS

| | | | |
|---|---|---|---|
| 2007/0133603 A1* | 6/2007 | Weaver | H04L 43/0882 370/468 |
| 2008/0192820 A1* | 8/2008 | Brooks | H04N 7/17318 375/240.02 |
| 2008/0310814 A1* | 12/2008 | Bowra | H04N 21/23406 386/241 |
| 2009/0080512 A1 | 3/2009 | Veerepalli et al. | |
| 2010/0002763 A1 | 1/2010 | Joung et al. | |
| 2010/0091835 A1* | 4/2010 | Morris | H04N 21/6405 375/240.01 |
| 2010/0158099 A1* | 6/2010 | Kalva | H04N 21/23412 375/240.01 |
| 2011/0096828 A1* | 4/2011 | Chen | H04N 21/23106 375/240.02 |
| 2011/0239078 A1* | 9/2011 | Luby | H04N 21/23106 714/752 |
| 2012/0330887 A1* | 12/2012 | Young | G06F 17/30017 707/610 |
| 2013/0088569 A1* | 4/2013 | Fredericks | H04N 13/00 348/43 |
| 2014/0020037 A1* | 1/2014 | Hybertson | H04N 21/2365 725/109 |

* cited by examiner

METHOD OF SMOOTH TRANSITION BETWEEN ADVERTISEMENT STREAM AND MAIN STREAM

BACKGROUND OF THE INVENTION

1. Field of the Invention

The present invention relates generally to media streaming systems and methods, and more specifically to media streaming systems and methods for internet protocol media streaming.

2. Discussion of the Related Art

A media stream is a stream of data that is formatted allowing a receiver to begin processing the data before receiving the entire stream. Data in a media stream can be received continuously or non-continuously by a stream management module according to the format of the stream, the processing of the data and/or the method of transference. The data may be displayed while new data is being delivered or retrieved from a media content provider.

Media stream receivers typically include memory for storing a portion of the media stream prior to decoding and displaying. The rate of download of the media stream is generally slower than the rate of decoding and displaying, so if no memory is used the decoder (and the resulting displayed media) pauses frequently to wait for additional media stream data to download to the receiver. To minimize the delay, decoding and display of the media stream is paused until the buffer memory has downloaded and stored enough of the media stream to allow for continuous or nearly continuous playback.

A media stream can be comprised of at least one sub-stream that transports a particular type of media content. For example, a multimedia stream can include a video type sub-stream and an audio type sub-stream.

While a sub-stream of a media stream can be affected by another sub-stream of the same media stream, the media stream is independent of other media streams. That is, media streams do not currently interact with other media streams.

Commonly, when a media stream is requested by a user from the content provider, when the stream is downloaded to the receiver the content provider includes information for an auxiliary media stream such as a media advertisement. The information generally includes a timecode for playing the auxiliary media stream after a certain time length of the requested media stream has been displayed.

Currently, if the standard media streaming format MPEG-4 is used to stream and display the media stream, the requested media stream is entirely downloaded, decoded and displayed before the receiver initiates downloading of the auxiliary media stream. The only playback information transmitted with the MPEG-4 stream is the stream location and order of playback. Thus, can a delay in playback can result while the viewer waits for the auxiliary stream to be buffered.

SUMMARY OF THE INVENTION

The present invention advantageously addresses the needs above as well as other needs by providing systems and methods for transitioning between two media streams.

In one embodiment, the invention can be characterized as a method for smooth transition between at least two media streams, comprising: transmitting by a streaming media receiver of a first content request to a content provider, requesting a first media stream, the streaming media receiver comprising a stream management module, a memory, a decoder module and a display module; receiving by the streaming media receiver of an XML file, the XML file comprising XML, including a first location for the first media stream, at least one auxiliary location for at least one auxiliary media stream, at least one timecode for determining a start display time for the at least one auxiliary media stream, a memory allocation datum; receiving by the streaming media receiver of the first media stream; storing of the first media stream in the memory; buffering, decoding, and displaying of the first media stream by the streaming media receiver; repetitively determining by the stream management module of an available memory quantity equal to a quantity of the memory not used for storing the first media stream, after the first media stream has been entirely stored in the memory; repetitively comparing the memory allocation datum to the available memory quantity; receiving of the at least one auxiliary media stream by the streaming media receiver when the available memory quantity is equal to or greater than the memory allocation datum; storing of the at least one auxiliary media stream in the memory; and decoding and displaying of the at least one auxiliary media stream when the at least one timecode is reached.

In another embodiment, the invention can be characterized as a method for smooth transition between at least two media streams, comprising: receiving of a first streaming media content request by a content provider, requesting a first media stream, the content provider including at least one module configured for receiving and processing the first streaming media content request; transmitting by the content provider of an XML file to a streaming media receiver, the XML file comprising XML, including a first location for the first media stream, at least one auxiliary location for at least one auxiliary media stream, at least one timecode for determining a start display time for the at least one auxiliary media stream, and a memory allocation datum.

In a further embodiment, the invention can be characterized as a system for smooth transition between at least two media streams, comprising: a first media stream; at least one auxiliary media stream; a streaming media receiver, the streaming media receiver comprising a stream management module, a memory, a decoder module, and a display module, whereby the streaming media receiver receives, stores, decodes and displays the first media stream and the at least one auxiliary media stream; and an XML file comprising XML, whereby the XML file includes a first location of the first media stream, a second location of the at least one auxiliary media stream, at least one timecode for a display start time of the at least one auxiliary media stream, and a memory allocation datum.

In a further embodiment, the invention can be characterized as a method for making a system for smooth transition between at least two media streams, comprising: providing a first media stream at a first location; providing at least one auxiliary media stream at an auxiliary location; providing a content provider configured to transmit an XML file; providing a streaming media receiver, the streaming media receiver comprising a stream management module, a memory, a decoder module, and a display module, whereby the streaming media receiver receives, stores, decodes and displays the first media stream and the at least one auxiliary media stream; and providing the XML file comprising XML, whereby the XML file includes the first location of the first media stream, the auxiliary location of the at least one auxiliary media stream, at least one timecode for a display start time of the at least one auxiliary media stream, and a memory allocation datum.

In a further embodiment, the invention can be characterized as a system for smooth transition between at least two media streams, comprising: means for transmitting by a streaming media receiver of a first content request to a content provider, requesting a first media stream, the streaming media receiver comprising a stream management module, a memory, a decoder module and a display module; means for receiving by the streaming media receiver of an XML file, the XML file comprising XML, including a first location for the first media stream, at least one auxiliary location for at least one auxiliary media stream, at least one timecode for determining a start display time for the at least one auxiliary media stream, a memory allocation datum; means for receiving by the streaming media receiver of the first media stream; means for storing of the first media stream in the memory; means for buffering, decoding, and displaying of the first media stream by the streaming media receiver; means for repetitively determining by the stream management module of an available memory quantity equal to a quantity of the memory not used for storing the first media stream, after the first media stream has been entirely stored in the memory; means for repetitively comparing the memory allocation datum to the available memory quantity; means for receiving of the at least one auxiliary media stream by the streaming media receiver when the available memory quantity is equal to or greater than the memory allocation datum; means for storing of the at least one auxiliary media stream in the memory; and means for decoding and displaying of the at least one auxiliary media stream when the at least one timecode is reached.

In a further embodiment, the invention can be characterized as a system for smooth transition between at least two media streams, comprising: means for receiving of a first streaming media content request by a content provider, the content provider including at least one module configured for receiving and processing the first streaming media content request; means for transmitting by the content provider of an XML file to a streaming media receiver, the XML file comprising XML, including a first location for a first media stream, at least one auxiliary location for at least one auxiliary media stream, at least one timecode for determining a start display time for the at least one auxiliary media stream, and a memory allocation datum.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
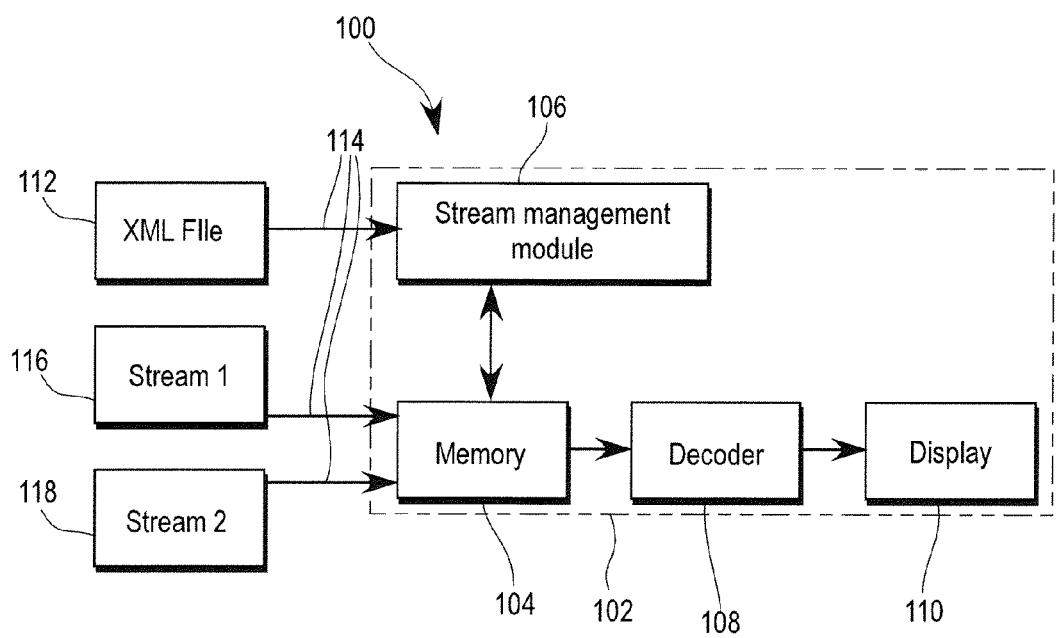
FIG. 1 is a block diagram of an Internet protocol streaming media system according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a block diagram is shown illustrating the structure of an Internet protocol streaming media system 100 according to an embodiment of the present invention. Shown are a streaming media receiver 102, a memory 104, a stream management module 106, a decoder module 108, a display module 110, an XML file 112, an internet protocol connection 114, a first media stream 116, an a second media stream 118.

The streaming media receiver 102 includes the stream management module 106, the memory 104, the decoder module 108 and the display module 110. The memory 104, the decoder module 108 and the display module 110 may be included in a MPEG decoder hardware module. In the embodiment shown, the streaming media receiver 102 includes modules capable of receiving, decoding and displaying MPEG-4 media streams as defined by the formal standard ISO/IEC 14496. The systems and methods shown herein may be applied to alternate audio and video digital standards. In the one embodiment, the streaming media receiver 102 modules transfer and receive data through bus communication, although those skilled in the art will not that other methods of data transfer are available.

The XML file 112 is transmitted to the stream management module 106 by the internet protocol connection 114 between the XML file 112 location and the streaming media receiver 102 through a standard http (hypertext transfer protocol) request or other suitable internet transfer protocol.

The internet protocol connection 114 may be a wired connection, such as an ethernet connection, or a wireless connection, such as a wireless modem. The XML (Extensible Markup Language) file 112 is transmitted in response to a content request 306 by a user (not shown), as shown below in FIG. 2. The XML file 112 comprises XML, and includes information about one or more server internet locations where one or more media streams 116, 118 reside, as well as other data as shown below in FIG. 2. The XML file 112 may also comprise an alternate markup language compatible with the stream management module 106.

The stream management module 106 includes components as necessary to the operation of the internet protocol streaming media system 100, including components for initiating media stream requests, reading and parsing the XML file 112, receiving one or more media streams 116, 118, transferring the media streams 116, 118 to the MPEG-4 decoder module 108, and monitoring and regulating the memory 104 and the decoder module 108.

The first media stream 116 is transmitted to the memory 104 through the internet protocol connection 114. In the embodiment shown, the first media stream 116 is MPEG-4 format. The first stream 116 includes the media stream as requested by the user.

The second media stream 118 is transmitted to the memory 104 through the internet protocol connection 114. In the embodiment shown, the second media stream 118 is MPEG-4 format. The second media stream 118 is an auxiliary media stream, for example a media advertisement, to be displayed on the internet protocol streaming media system 100 at a time after the display start of the first stream 116.

The memory 104 receives the media streams 116, 118 at times as directed by the stream management module 106. In the preferred embodiment, the memory 104 is DRAM (dynamic random-access memory) type memory, but may be of any type suitable for low-latency storage and retrieval of files. The memory 104 stores the downloaded media stream 116, 118 until directed by the stream management module 106 to transfer one of the media streams 116, 118 to the decoder module 108. The media stream 116, 118 may be transferred to the decoder module 108 by a direct electrical connection or a wireless connection.

The decoder module 108 receives the media stream 116, 118 from the memory 104. The decoder module 108 includes components for decoding and displaying the media stream on the display module 110. In the embodiment shown, the decoder module 108 includes components for the MPEG-4 format. Components of the MPEG-4 decoder module 108 include a DAI (DMIF Application Interface), a decoding buffer, an ESI (Elementary Stream Interface), a decoder, a composition memory, and a compositor. The decoder module 108 decodes and composites the media stream 116, 118 and transmits it to the display module 110. The composited media stream 116, 118 may be transmitted to the display module 110 by a direct electrical connection or a wireless connection.

The display module 110 receives the composited media stream 116, 118 from the decoder module 108 and displays it on a display screen (not shown), for example, an LCD, plasma, LED or CRT screen. The display module 110 includes components for receiving the composited media stream 116, 118 from the decoder module 108 and displaying the media stream 116, 118 on the display screen.

Referring again to FIG. 1, the internet protocol streaming media system 100 shown is capable of downloading separate media streams 116, 118 simultaneously, as shown further below in FIGS. 2-4. When the first media stream 116 (also referred to as Stream 1) is requested by the user, the XML file 112 is transmitted to the stream management module 106 through the internet protocol connection 114. The XML file 112 includes at least one XML datum for allocating the memory 104. The stream management module 106 utilized the XML file 112 data and the memory 104 capacity to dynamically monitor and control the memory 104 allocation. During the first stream 116 download, when the stream management module 106 determines that sufficient memory 104 capacity exists (see FIG. 4 below), the stream management module 106 initiates the download of Stream 2 118 while Stream 116 continues to download. Downloading of the media streams 116, 118 simultaneously reduces delay when transitioning from display of the first stream 116 to display of the second stream 118, as at least a portion of the second stream 118 will already have been downloaded when a second stream start time 316 is reached, and buffer time is decreased or eliminated.

When a portion of the first media stream 116 downloaded and stored on the memory 104 is transferred to the decoder module 108, the memory 104 previously used to store that portion of the first stream 116 is used to receive and store additional portions of the first media stream 116.

Figure 2:
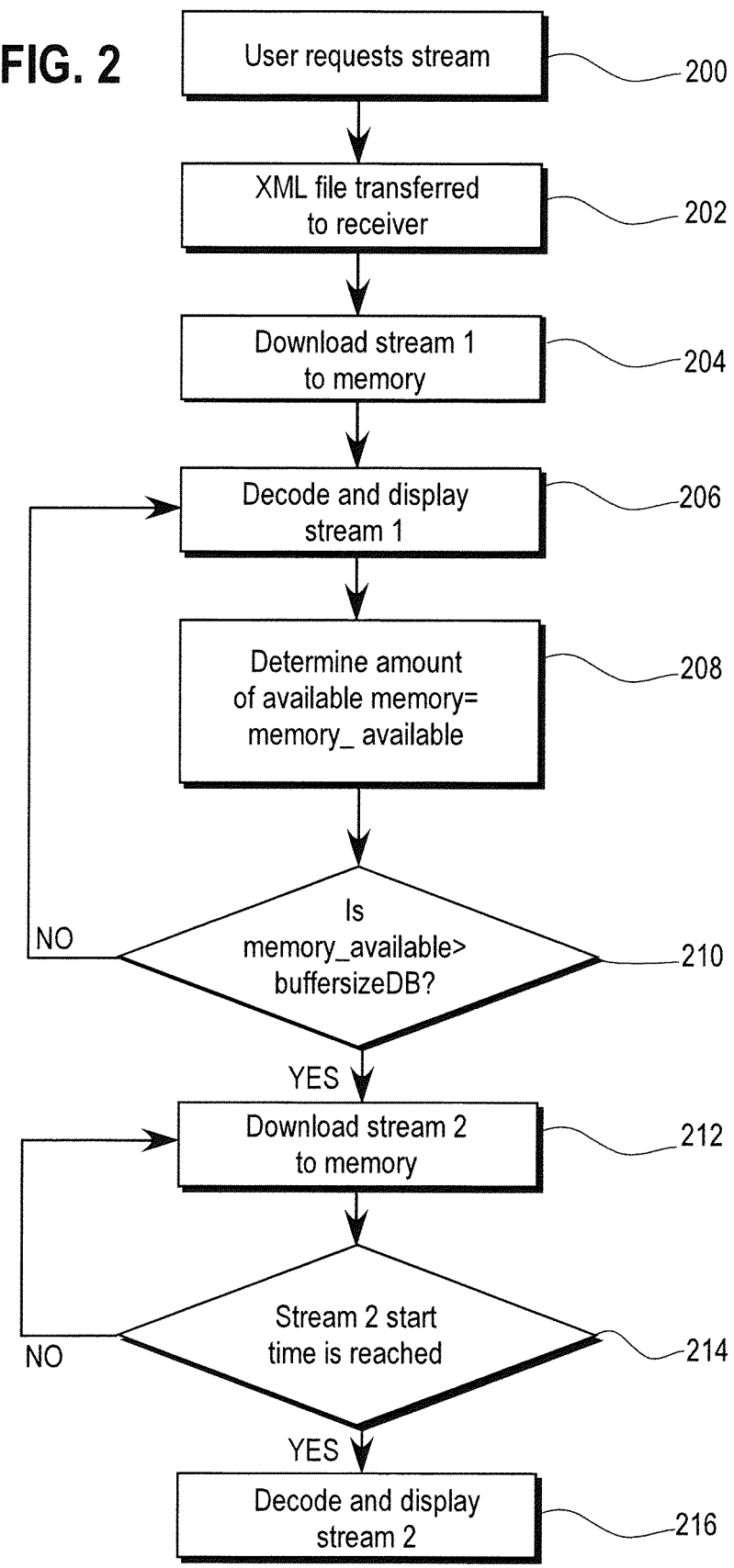
FIG. 2 is a flow diagram showing a method for smooth transitioning between two media content streams according to an embodiment of the present invention.

Referring next to FIG. 2, a method for smooth transitioning between two media content streams is shown. Shown are a request content step 200, an XML file step 202, a download first stream step 204, a display first stream step 206, an available memory step 208, a memory check decision point step 210, a download second stream step 212, a start time decision point step 214, and a display second stream step 216.

Initially, during the request content step 200 the user (not shown) transmits the content request 306 to the streaming media receiver 102 for the first media stream 116 to be displayed on the streaming media receiver 102. The stream management module 106 transmits the content request 306 to a location specified for the first stream 116 and accessible using a standard protocol such as HTTP (Hypertext Transfer Protocol) or HTTPS (Hypertext Transfer Protocol Secure). The method then proceeds to the XML file step 202.

During the XML file step 202, the stream management module 106 receives the XML file 112 from an internet location 300 as provided by a content provider. The XML file 112 includes locations of the files for the main first stream 116, and also locations for the auxiliary second stream 118 to be played at a later time. The XML file 112 also includes an available memory datum buffersizeDB 326 and a second stream start time timecode 324 as shown below in FIG. 3. The method then proceeds to the download first stream step 204.

During the download first stream step 204, the memory 104 (as shown in FIG. 1) receives the MPEG-4 first stream 116 sub-streams and stores them in the memory 104 until the time of decoding and displaying. The stream management module 106 may include parameters for dynamically determining the amount of the first stream 116 to be stored in the memory 104 before decoding and displaying will take place. Ideally, the size of the first stream 116 files stored in the memory 104 would be large enough that the remainder of the first stream 116 would be decoded and displayed before the second stream start time 316 without exhausting the files stored in the memory 104. The method then proceeds to the display first stream step 206.

The display first stream step 206 includes the decoding and display of the first stream 116 by the decoder module 108 and the display module 110. The method then proceeds to the available memory step 208.

During the available memory step 208, the stream management module 106 determines the amount of the memory 104 available, i.e. memory that is not needed for storing of the first stream 116. For example, the stream management module 106 may be configured to check an available memory 436 quantity whenever the decoder module 108 consumes first stream 116 files from the memory 104. This typically occurs after the first stream 116 media files have been completely downloaded to the memory 104. As the decoder module 108 receives the files from the memory 104, as there is no more first stream 116 data, the memory 104 is available for additional data storage. The current amount of memory 104 available is defined as a memory_available datum. The method then proceeds to the memory check decision point step 210.

The memory check decision point step 210 is used to determine whether enough memory 104 is available to start downloading the second media stream 118. The stream management module 106 checks whether the memory_available datum is greater than the buffersizeDB datum 326 as received from the XML file 112. If the memory_available datum is less than the buffersizeDB datum 326, the method returns to the download first stream step 204. If the memory_available datum is greater than the buffersizeDB datum 326, the method proceeds to the download second stream step 212.

During the download second stream step 212, the memory 104 receives the MPEG-4 second stream 118 sub-streams and stores them in the memory 104 until the time of decoding and displaying of the second stream 118. The method then proceeds to the start time decision point step 214.

The start time decision point step 214 determines whether the second stream start time 316 has been reached. If the current time is equal to the second stream start time 316, the method proceeds to the display second stream step 216. If the second stream start time 316 has not yet been reached, the method returns to the download second stream step 212.

During the display second stream step 216, the streaming media receiver 102 initiates decoding and displaying of the second stream 118 stored in the memory 104.

Referring again to FIG. 2, the method shown illustrates on embodiment of smooth transition between two media streams: the main first stream 116 and the auxiliary second stream 118.

The method uses the initial XML file 112 to include the buffersizeDB datum 326, which is used to allocate memory to download the auxiliary second stream 118 while the first stream 116 is still being decoded and displayed.

The buffersize DB datum 326 contains the minimum amount of the memory 104 required by the second stream 118 to result in display of the second stream 118 with a minimum of delay and/or pausing to rebuffer. The buffersizeDB datum 326 value may be included in the XML file 112 as a static value, for instance a value related solely to the size of the second stream 118, or the XML file 112 may be dynamically generated by a content provider with the buffersizeDB datum 326 value depending on the download rate between the streaming media receiver 102 and the content provider at the time the first stream 116 is requested.

The stream management module 106 continually monitors the memory 104, and checks the available memory 436 (the memory_available datum) against the buffersizeDB datum 326. When the available memory datum exceeds the buffersizeDB datum 326, the streaming media receiver 102 begins downloading of the second stream 118 to the memory 104 while the first stream 116 is still being decoded and displayed. The second stream 118 is then available for decoding and displaying immediately at the second stream start time 316, without requiring additional downloading. The second stream 118 then continues to download, decode and display until the end of the second stream 118 is reached.

Figure 3:
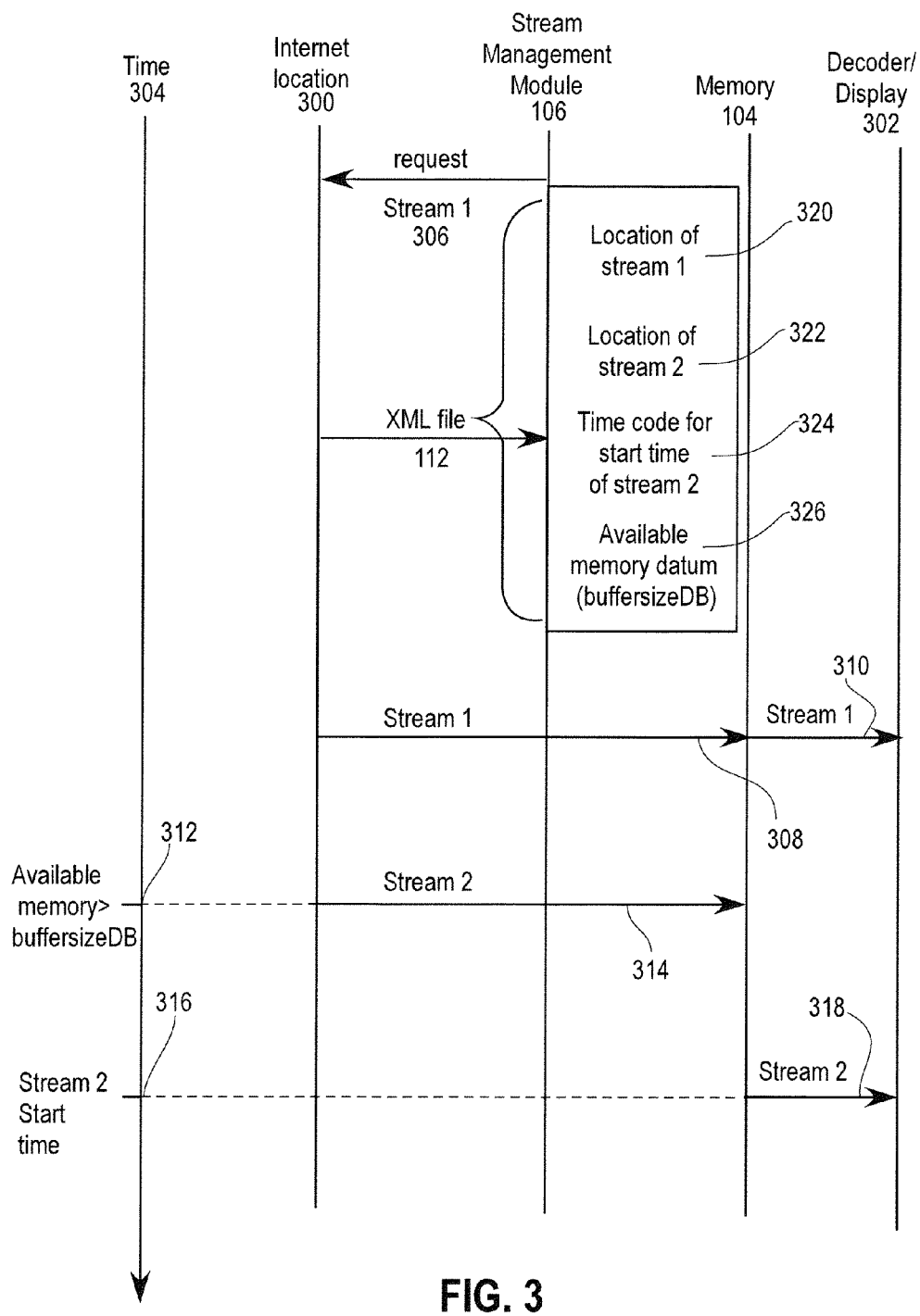
FIG. 3 is a line diagram of an embodiment of device communication for the method for smooth transitioning between two media content streams according to an embodiment of the present invention.

Referring next to FIG. 3, a line diagram of an embodiment of device communication for the internet protocol streaming method shown in FIG. 2 is shown. Shown are the internet location 300, the stream management module 106, the memory 104, a decoder/display 302, a timeline 304, the content request 306, the XML file 112, a download first stream 308, a decode/display first stream 310, a memory available time 312, a download second stream 314, the second stream start time 316, a decode/display second stream 318, a first stream internet location 320, a second stream internet location 322, the timecode 324, and the memory datum (buffersizeDB) 326.

The internet location 300 shown is an off-site internet location 300 where data is retrieved from. The internet location 300 may vary, for example the internet location of the stream targeted by the initial request 306 may be a different location from the location of media stream files.

The stream management module 106 and the memory 104 correspond to those components as shown in FIG. 1. The decoder/display 302 corresponds to the combination of the decoder module 108 and the display module 110 as shown in FIG. 1. The components transmit and receive data through connections as shown above in FIG. 1.

The timeline 304 is also shown, indicating the passage of time during which the internet protocol streaming media system 100 is used.

Initially, the user requests, through input to the stream management module 106, the first media stream 116, as shown by the content request 306 arrow pointing from the stream management module 106 to the remote Internet location 300. The stream management module 106 includes locations for content streams accessible using a standard protocol such as HTTP (Hypertext Transfer Protocol) or HTTPS (Hypertext Transfer Protocol Secure).

The stream management module 106 transmits the content request 306 to the internet location 300 and receives the XML file 112 for the first media stream 116, as shown by the XML file 112 arrow pointing from the remote internet location 300 to the stream management module 106. The XML file 112 includes the first stream internet location 320, the second stream internet location 322, at least one timecode 324 indicating start time for the second stream 118, and the available memory datum 326 (buffersizeDB). Those skilled in the art will note that additional information may be included in the XML file 112, for example, internet locations, timecodes for additional media streams, and content metadata.

After receiving the XML file 112, the stream management module 106 then retrieves the first media stream 116 from the first stream internet location 320 specified in the XML file 112. The first stream 116 transfer is indicated by the arrow pointing from the remote internet location 300 to the memory 104, and corresponds to the download first stream step 204 shown in FIG. 2. The first stream 116 is then continuously decoded and displayed as indicated by the decode/display first stream 310 arrow from the memory 104 to the decoder/display 302, and corresponds to the display first stream step 206 as shown in FIG. 2.

During the decoding and displaying of the first stream 116, the stream management module 106 continually monitors the memory 104 as shown in the available memory step 208 and the memory check decision point step 210 shown in FIG. 2. The time when the available memory 436 is greater than the buffersizeDB datum 326 is shown on the timeline 304 as the memory available time 312. At the memory available time 312, the stream management module 106 starts to download the second stream 118 from the second stream internet location 322 specified in the XML file 112. The second stream transfer 314 is indicated by the arrow pointing from the remote internet location 300 to the memory 104, and corresponds to the download second stream step 212 shown in FIG. 2. The first stream 116 continues to be displayed on the screen and the second stream 118 stored in the memory 104 is not decoded/displayed.

At a time after the available memory time 312, the second stream start time 316 is reached. The second stream start time 316 is determined by the timecode 324 included in the XML file 112. At the second stream start time 316, the stream management module 106 directs the decoder/display 302 to begin decoding and displaying of the second stream 118, and the second stream 118 is displayed, as indicated by the decode/display second stream 318 arrow from the memory 104 to the decoder/display 302.

Figure 4:
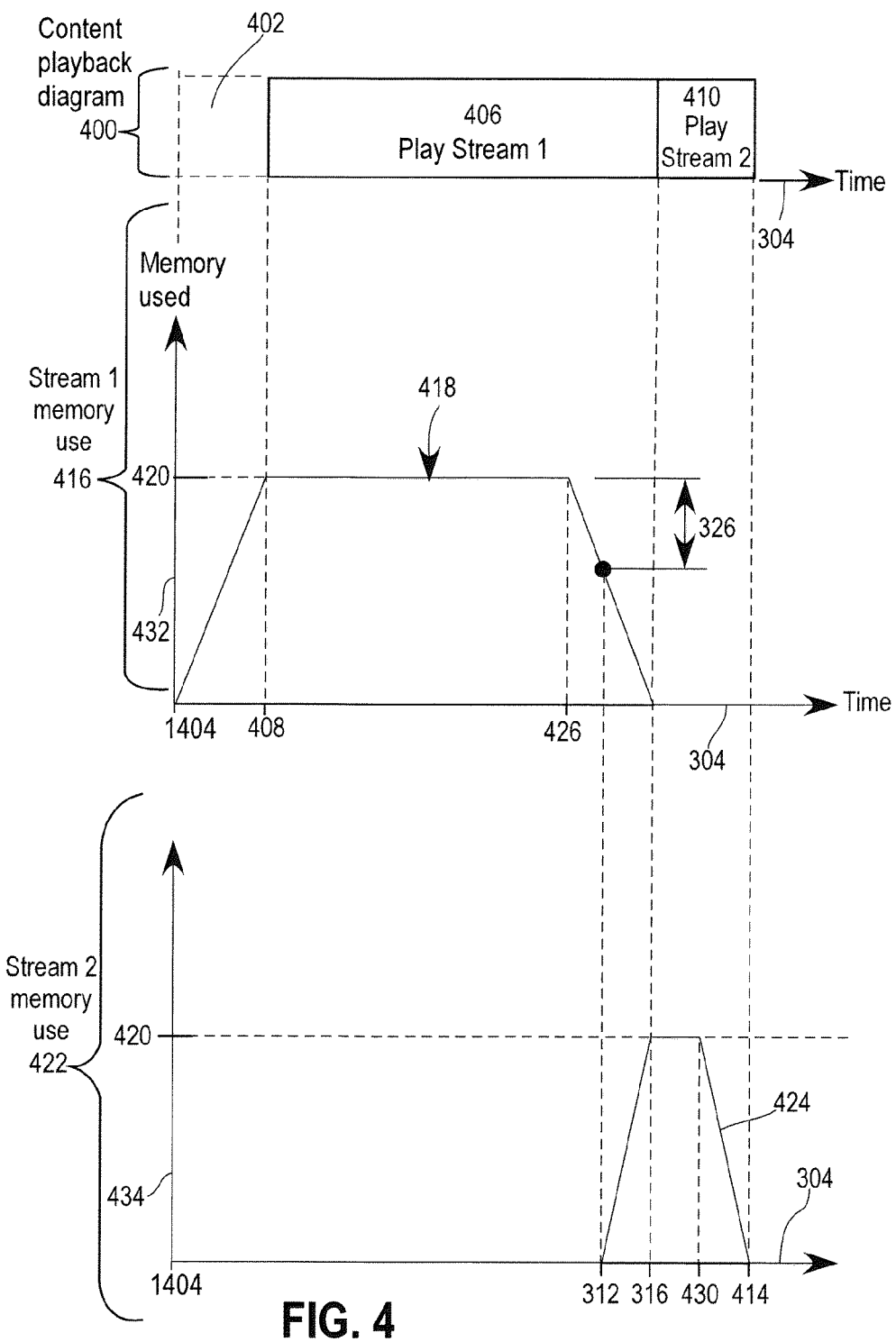
FIG. 4 is a schematic diagram of memory usage and stream playback according to the method for smooth transitioning between two media content streams.

Referring next to FIG. 4, a schematic diagram of memory usage and stream playback is shown. Shown are the timeline 304, a content playback diagram 400, a buffer first stream segment 402, a download start time 404, a display first stream segment 406, a display first stream start time 408, a display second stream segment 410, a second stream start time 412, a display second stream end time 414, a first stream memory usage graph 416, a first stream memory usage 418, a maximum memory value 420, a second stream memory usage graph 422, a second stream memory usage 424, a first stream download complete time 426, the available memory time 428, and a second stream download complete time 430.

The timeline 304 is shown as a horizontal axis extending to the right. The origin of the timeline 304 axis indicates the start of downloading of the first stream 116 (the download start time 404). The top content playback diagram 400 is a graphical representation of the content playback as displayed by the streaming media receiver 102 (not shown).

The first segment of the content playback diagram 400 is the buffer first stream segment 402. The buffer first stream segment 402 extends from the download start time 404 to the display first stream start time 408. During the buffer first stream segment 402 the first stream 116 is downloaded to the memory but display of the first stream 116 has not yet started. The display first stream start time 408 is determined by the stream management module 106 as described above.

The next temporal segment of the content playback diagram 400 is the display first stream segment 406. The display first stream segment 406 extends from the display first stream start time 408 to the second stream start time 412. The second stream start time 2 corresponds to the timecode 324 transmitted with the XML file 112 as described in FIGS. 1-3. During the display first stream segment 406, the first media stream 116 is displayed on the streaming media receiver 102.

The last segment shown is the display second stream segment 410. The display second stream segment 410 extends from the second stream start time 412 to the display second stream end time 414. The display second stream end time 414 corresponds to the time when the entirety of the second stream 118 has been displayed on the streaming media receiver 102. During the display second stream segment 410, the second stream 118 is displayed on the streaming media receiver 102.

Below and with the timeline 304 parallel to the timeline 304 of the content playback diagram 400 detailed above, the first stream memory usage graph 416 is shown. A first vertical axis 432 of the first stream memory usage graph 416 indicates the amount of the memory 104 used to store first stream 116 data. The maximum memory value 420 as shown on the first vertical axis 432 corresponds to the total memory 104 of the streaming media receiver 102 available for storage of streaming media.

The first stream memory usage 418 corresponds to the memory 104 used to store the first stream 116 over time. At the download start time 404, the first stream memory usage 418 is zero. During the buffer first stream segment 402, ending at the display first stream start time 408, the first stream memory usage 418 increases until it reaches the maximum memory value 420 at the display first stream start time 408. The first stream memory usage 418 is shown increasing linearly, but the rate of increase of the first stream memory usage 418 may also be non-linear.

During a portion of the display first stream segment 406, until the first stream download complete time 426, the first stream memory usage 418 remains constant at the maximum memory value 420. The first stream download complete time 426 corresponds to the time when all of the required first stream 116 data have been downloaded and stored to the memory 104.

Between the first stream download complete time 426 and the second stream start time 316, the first stream memory usage 418 decreases from the maximum memory value 420 to a value of zero at the second stream start time 316. As the decoder module 108 continues to decode the first stream 116, while no new content is being downloaded, the first stream memory usage 418 decreases until all of the first stream 116 stored in the memory 104 has been decoded. The first stream memory usage 418 is shown decreasing linearly, but the rate of decrease of the first stream memory usage 418 may also be non-linear.

Below the first stream memory usage graph 416 and with the timeline 304 parallel to the timeline 304 of the content playback diagram 400 segments detailed above, the second stream memory usage graph 422 is shown. A second vertical axis 434 of the second stream memory usage graph 422 indicates the amount of the memory 104 used to store the second stream 118 data. The maximum memory value 420 as shown on the second vertical axis 434 corresponds to the total memory 104 of the streaming media receiver 102 available for storage of streaming media.

The value of the second stream memory usage 424 is zero until the available memory time 428. The available memory time 428 corresponds to the time when the difference between the first stream memory usage 418 and the maximum memory value 420 (the available memory 436 datum) is equal to the buffersizeDB datum 326 value. As shown above in FIG. 2, at this time the stream management module 106 directs the streaming media receiver 102 to download the second stream 118 to the memory 104. The usage of the memory 104 by the downloading of the second stream 118 is shown by the second stream memory usage 424 increasing from zero at the available memory time 428 to the maximum memory value 420 at the second stream start time 412. The second stream memory usage 424 is shown increasing linearly, but the rate of increase of memory usage may also be non-linear, depending on the rate of increase of the second stream memory usage 424.

The value of the second stream memory usage 424 stays constant, at the maximum memory value 420, until the second stream download complete time 430. The seconds stream download complete time 430 corresponds to the time when all of the required second stream 118 data have been downloaded and stored to the memory 104.

Between the second stream download complete time 430 and the display second stream end time 414 the second stream memory usage 424 decreases from the maximum memory value 420 to a value of zero at the Stream 2 display end time. As the decoder module 108 continues to decode the second stream 118, while no new content is being downloaded, the second stream memory usage 424 decreases until all of the second stream 118 data stored in the memory 104 have been decoded. The second stream memory usage 424 is shown decreasing linearly, but the rate of decrease of the second stream memory usage 424 may also be non-linear.

The skilled artisan will note that, even though the display is shown ending with the display second stream end time 414, additional content media streams may be streamed after the second stream 118, following the same method.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for transition between at least two media streams, comprising:
    transmitting by a streaming media receiver of a first content request to a content provider, requesting a first media stream, the streaming media receiver comprising a stream management module, a memory, a decoder module and a display module;
    receiving by the streaming media receiver of an XML file, the XML file comprising XML and including a first location for the first media stream, at least one auxiliary location for at least one auxiliary media stream, at least one timecode for determining a start display time for the at least one auxiliary media stream, and a memory allocation datum indicating a quantity of memory;
    receiving of the first media stream by the streaming media;
    storing of the first media stream in the memory;
    buffering, decoding, and displaying of the first media stream by the streaming media receiver;
    repetitively determining by the stream management module of an available memory quantity equal to a quantity of the memory not used for storing the first media stream, after the first media stream has been entirely stored in the memory;
    repetitively comparing the memory allocation datum to the available memory quantity;
    receiving of the at least one auxiliary media stream by the streaming media receiver when the available memory quantity is equal to or greater than the memory allocation datum;
    storing of the at least one auxiliary media stream in the memory; and
    decoding and displaying of the at least one auxiliary media stream when the at least one timecode is reached.

2. The method for transition between the at least two media streams according to claim 1, wherein the media streams comprise MPEG-4 media streams.

3. A method for transition between at least two media streams, comprising:
    receiving of a first streaming media content request by a content provider, requesting a first media stream, the content provider including at least one module configured for receiving and processing the first streaming media content request;
    transmitting by the content provider of an XML file to a streaming media receiver, the XML file comprising XML,
    including a first location for the first media stream,
    at least one auxiliary location for at least one auxiliary media stream,
    at least one timecode for determining a start display time for the at least one auxiliary media stream, and
    a memory allocation datum indicating a quantity of memory, wherein the memory allocation datum is used to determine a download start time of the auxiliary media stream.

4. The method for transition between the at least two media streams according to claim 3, further comprising:
    receiving of a first media stream request at the first location of the first media stream; and
    transmitting the first media stream to the streaming media receiver.

5. The method for transition between the at least two media streams according to claim 4, wherein the first media stream comprises an MPEG-4 media stream.

6. The method for transition between the at least two media streams according to claim 4, further comprising:
    receiving of an auxiliary media stream request at the at least one auxiliary location for the at least one auxiliary media stream; and
    transmitting the at least one auxiliary media stream to the streaming media receiver.

7. The method for transition between the at least two media streams according to claim 6, wherein the media streams comprise MPEG-4 media streams.

8. A system for transition between at least two media streams, comprising:
- a first media stream;
- at least one auxiliary media stream;
- a streaming media receiver, the streaming media receiver comprising a stream management module, a memory, a decoder module, and a display module, whereby the streaming media receiver receives, stores, decodes and displays the first media stream and the at least one auxiliary media stream; and
- an XML file comprising XML, whereby the XML file includes a first location of the first media stream, a second location of the at least one auxiliary media stream, at least one timecode for a display start time of the at least one auxiliary media stream, and a memory allocation datum indicating a quantity of memory, wherein the memory allocation datum is used to determine a download start time of the auxiliary media stream.

9. The system for transition between the at least two media streams according to claim 8, wherein the media streams comprise MPEG-4 media streams.

10. The system for transition between the at least two media streams according to claim 8, wherein the stream management module is configured for repetitively determining of an available memory quantity equal to a quantity of the memory not used for storing the first media stream, after the first media stream has been entirely stored in the memory.

11. The system for transition between the at least two media streams according to claim 10, wherein the media streams comprise MPEG-4 media streams.

12. The system for transition between the at least two media streams according to claim 10, wherein the stream management module is configured for comparing the memory allocation datum to the available memory quantity and receiving of the at least one auxiliary media stream by the streaming media receiver when the available memory quantity is equal to or greater than the memory allocation datum.

13. The system for transition between the at least two media streams according to claim 12, wherein the media streams comprise MPEG-4 media streams.

14. A method for making a system for transition between at least two media streams, comprising:
- providing a first media stream at a first location;
- providing at least one auxiliary media stream at an auxiliary location;
- providing a content provider configured to transmit an XML file;
- providing a streaming media receiver, the streaming media receiver comprising a stream management module, a memory, a decoder module, and a display module, whereby the streaming media receiver receives, stores, decodes and displays the first media stream and the at least one auxiliary media stream; and
- providing the XML file comprising XML, whereby the XML file includes the first location of the first media stream, the auxiliary location of the at least one auxiliary media stream, at least one timecode for a display start time of the at least one auxiliary media stream, and a memory allocation datum indicating a quantity of memory, wherein the memory allocation datum is used to determine a download start time of the auxiliary media stream.

15. The method for making the system for transition between the at least two media streams according to claim 14, wherein the media streams comprise MPEG-4 media streams.

16. The method for making the system for transition between the at least two media streams according to claim 14, wherein the stream management module is configured for repetitively determining of an available memory quantity equal to a quantity of the memory not used for storing the first media stream, after the first media stream has been entirely stored in the memory.

17. The method for making the system for transition between the at least two media streams according to claim 16, wherein the media streams comprise MPEG-4 media streams.

18. The method for making the system for transition between the at least two media streams according to claim 16, wherein the stream management module is configured for comparing the memory allocation datum to the available memory quantity and receiving of the at least one auxiliary media stream by the streaming media receiver when the available memory quantity is equal to or greater than the memory allocation datum.

19. The method for making the system for transition between the at least two media streams according to claim 18, wherein the media streams comprise MPEG-4 media streams.

* * * * *